United States Patent [19]

Brockelbank

[11] Patent Number: 4,534,242
[45] Date of Patent: Aug. 13, 1985

[54] VARIABLE POWER TRANSMISSION FOR CONVERTING RECIPROCATING MOTION TO ROTARY MOTION

[76] Inventor: David M. Brockelbank, 8954 Kennedy St., Riverside, Calif. 92509

[21] Appl. No.: 584,168

[22] Filed: Feb. 27, 1984

Related U.S. Application Data

[63] Continuation of Ser. No. 237,741, Feb. 24, 1981, abandoned.

[51] Int. Cl.³ .......................... F16C 3/28; F16H 21/20
[52] U.S. Cl. .......................................... 74/600; 74/837
[58] Field of Search ............. 74/89.15, 412 TA, 600, 74/837; 123/48 B; 464/42, 43, 99

[56] References Cited

U.S. PATENT DOCUMENTS

| | | | |
|---|---|---|---|
| 607,116 | 7/1898 | Haynes et al. | 74/600 |
| 641,313 | 1/1900 | Martin | 74/600 |
| 678,546 | 7/1901 | Corson | 123/48 B |
| 771,928 | 10/1904 | Persson | 74/600 |
| 1,099,473 | 6/1914 | Sundh | 74/600 |
| 3,611,836 | 10/1971 | Weck | 74/837 |
| 3,789,696 | 2/1974 | Beam | 74/89.15 |
| 4,046,241 | 9/1977 | Furtah | 74/89.15 |
| 4,180,719 | 12/1979 | Lutz | 74/600 |
| 4,365,962 | 12/1982 | Regelsberger | 74/412 TA |

FOREIGN PATENT DOCUMENTS

| | | | |
|---|---|---|---|
| 183999 | 12/1955 | Austria | 464/42 |
| 558571 | 5/1923 | France | 74/600 |

OTHER PUBLICATIONS

Noy, "Six Ingenious Jobs for Roller Chain", Mechanisms, Linkages & Mechanical Controls, 1965, pp. 232–233.
Ingenious Mechanisms for Designers & Inventors, vol. II, Edited by F. D. Jones, 1957, pp. 225–227; 232–233.

Primary Examiner—Lawrence J. Staab
Attorney, Agent, or Firm—Frank D. Gilliam

[57] ABSTRACT

A variable power transmission for varying the power from a reciprocating power source to a rotatable axle shaft comprising a crank interconnecting the power source to a rotatable wheel through a crank pin, an inner wheel jack shaft with gears or sprockets mating with gears or chains loosely carried by the rotating wheel, a crank pin sliding block carrying the crank pin on one end and threadedly engaging the jack shaft at its opposite end, a counter weight threadedly engaging the jack shaft opposite the crank pin sliding block and brakes for selectively stopping the rotation of a selected one of the gears or chains whereby the jack shaft turns translating the crank pin sliding block and counter weight along the jack shaft.

12 Claims, 7 Drawing Figures

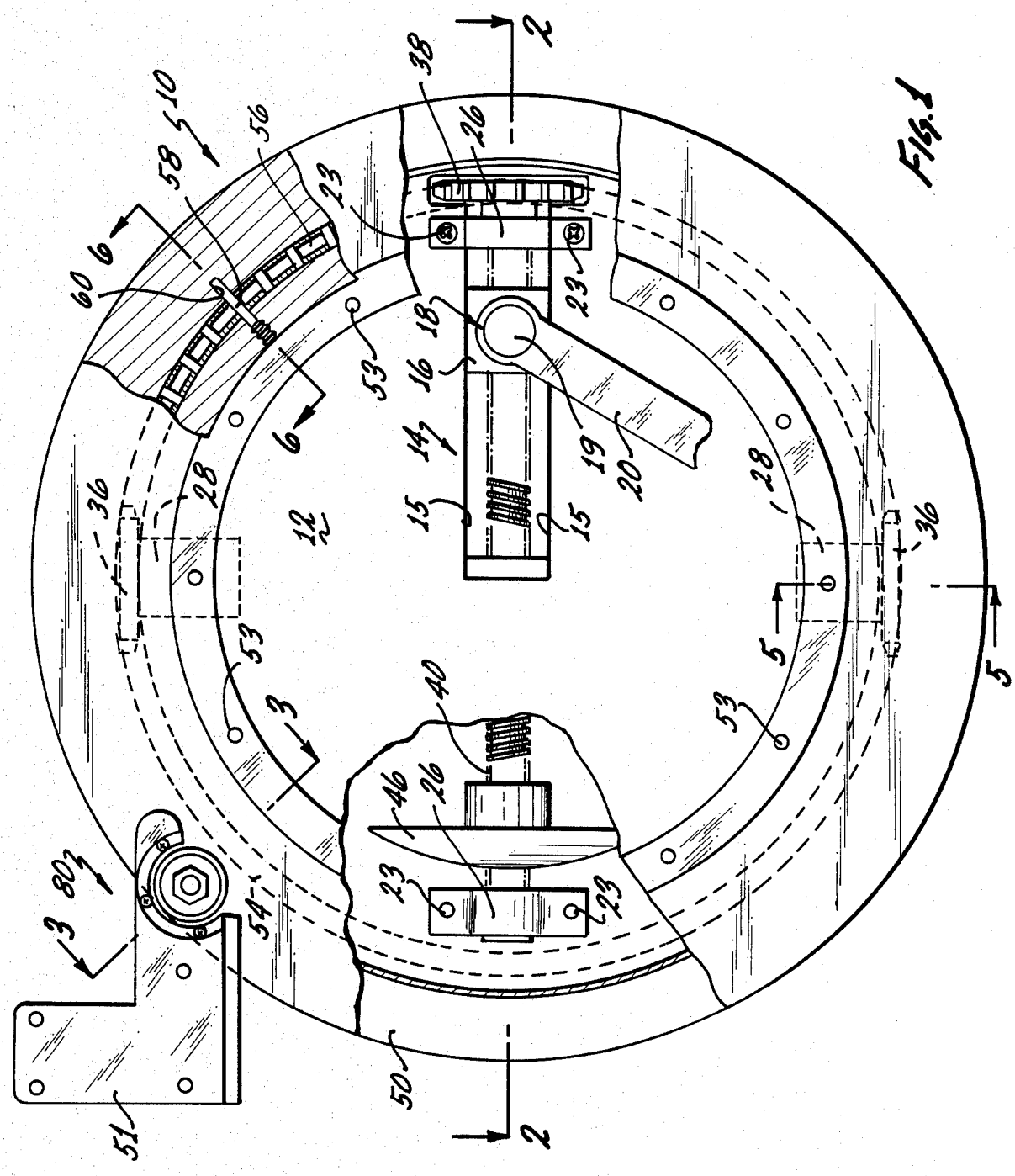

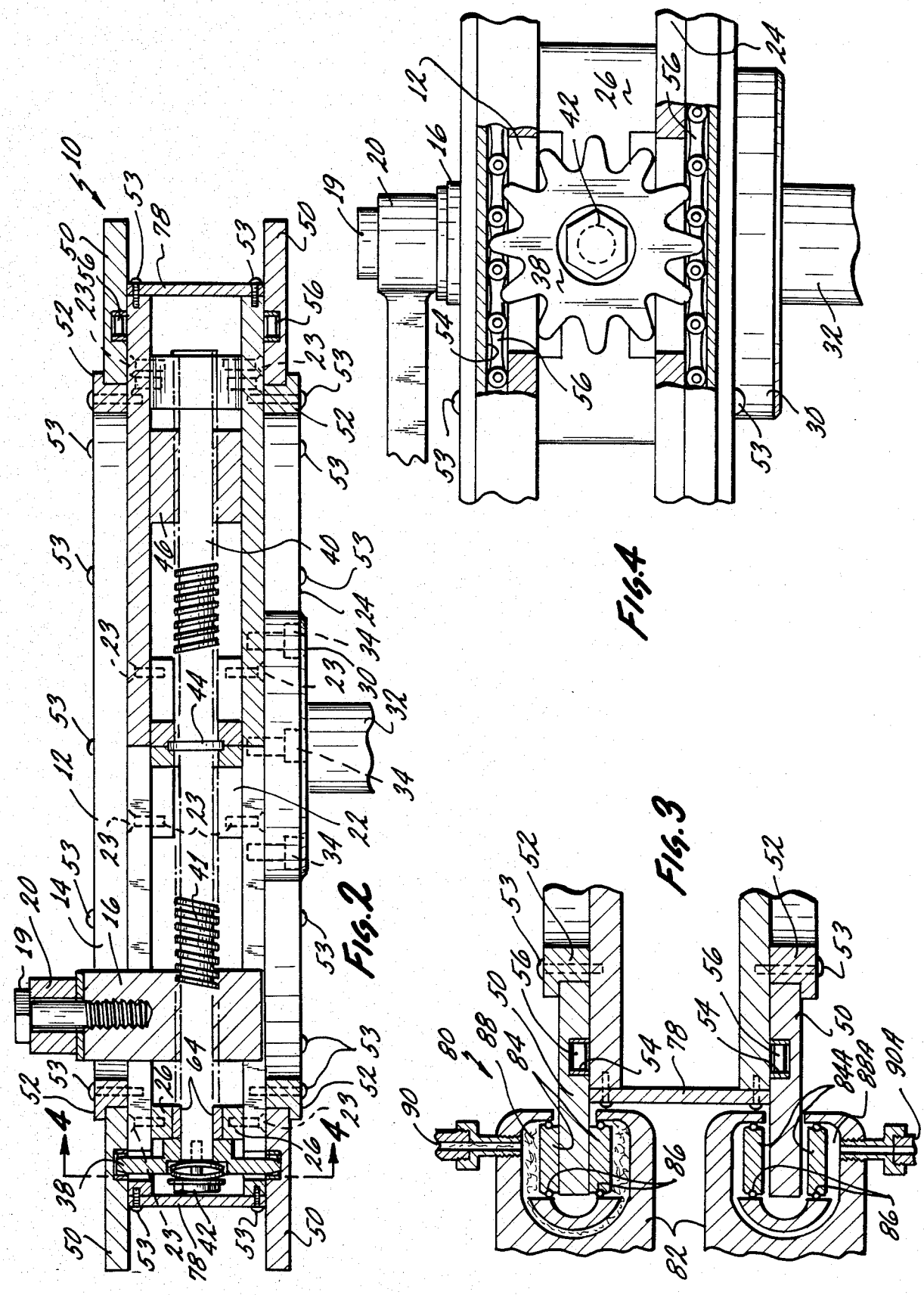

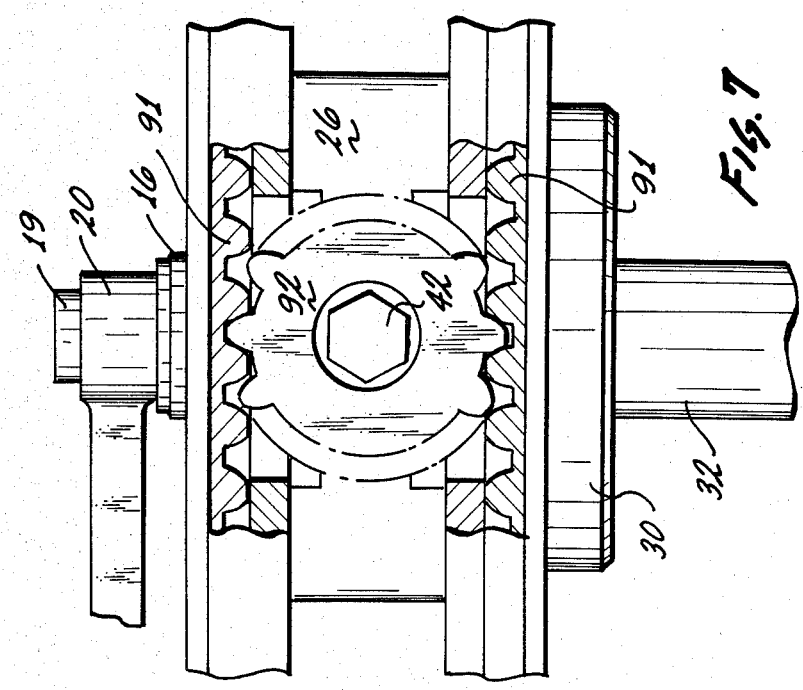
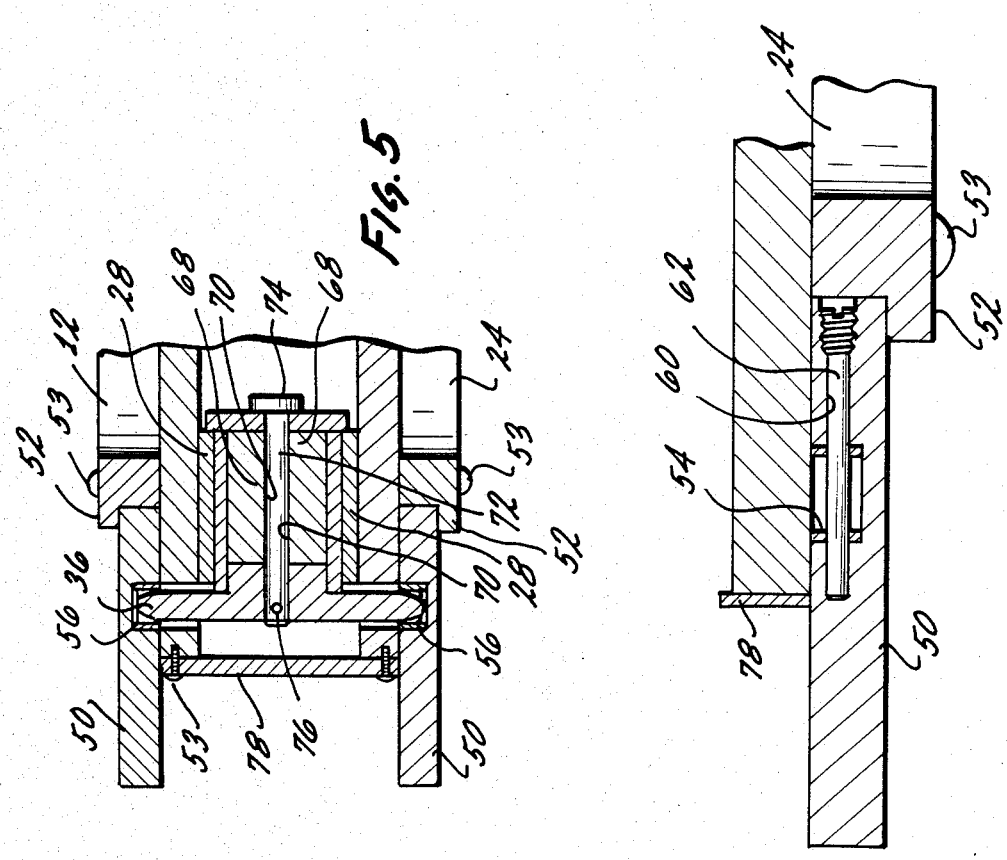

VARIABLE POWER TRANSMISSION FOR CONVERTING RECIPROCATING MOTION TO ROTARY MOTION

This a continuation of application Ser. No. 237,741, filed 2/24/81, now abandoned.

BACKGROUND OF THE INVENTION

The present invention relates to a variable speed transmission for supplying variable output power with respect to a given input power from a reciprocating source and more specifically to a transmission that is speed adjustable during power applications.

U.S. Pat. No. 1,770,441 teaches speed regulating mechanism for a reciprocating power source, a steam engine, by the manual selection of various gear ratios. A transmission of this type is considered conventional in operation and includes inadequacies, such as, power loss due to rotating function and abrupt ratio changes resulting in a jerkiness of output.

U.S. Pat. No. 590,929 teaches a power transmission of the general type claimed by Applicant. In this teaching, a reciprocating power source drives a screw which carries a translating block, the block is pivotly attached to a gear wheel through a connecting rod. This transfer of linear motion to rotary motion is well known. The teaching lacks any means for translating the gear wheel/connecting rod attachment point.

U.S. Pat. Nos. 631,208 and 1,096,793 generally teach converting reciprocating power to rotary power, but like the above mentioned U.S. Pat. No. 590,929 fail to teach any means for changing the output power or speed ratios with respect to input power or speed ratios by the positioning of the connecting rod to wheel connections.

There has not been a satisfactory means for changing the power or speed ratios of reciprocating to rotary power until the emergence of the instant invention.

SUMMARY OF THE INVENTION

According to an embodiment of the instant invention an input source of reciprocating power is converted to rotary output power wherein the output speed or power ratio with respect to the input power can be changed linearly through an infinite range from near zero to available maximum during operation by the translation of the reciprocating power connection along the radius of a rotating wheel.

An object of this invention is to provide a transmission means that has an infinite number of different output speed and power ratios with respect to input speeds and power.

Another object of this invention is to provide a power transmission having a minimum number of moving parts.

Another object of this invention is to provide a transmission that operates in either a forward or reverse mode and has an equal number of different output speeds and power ratios in either forward or reverse.

Still another object of this invention is to provide a transmission that is variable through an infinite number of output speeds and power ratios when installed in a backward mode that is driven by rotary input power, for example, by de-acceleration of vehicles, etc.

Still a further object of this invention is to provide a variable power transmission which has a positive mechanical lock to the power source at all times.

Still a further object of this invention is to provide a transmission which has a built-in over-ride device which protects the transmission against extreme position applications.

Other advantages and features of the instant invention will be apparent from the following detailed description and accompanying drawings in which:

BRIEF DESCRIPTION OF THE DRAWINGS

FIG. 1 is the input side plan view of an embodiment of the invention in partial cutaway;
FIG. 2 is a showing taken along line 2—2 of FIG. 1;
FIG. 3 is a showing taken along line 3—3 of FIG. 1;
FIG. 4 is a showing taken along line 4—4 of FIG. 2;
FIG. 5 is a showing taken along line 5—5 of FIG. 1;
FIG. 6 is a showing taken along line 6—6 of FIG. 1; and
FIG. 7 is a second embodiment of FIG. 4 showing a pair of ring gears and a pinnion gear in place of the pair of chains and sprocket of FIG. 4.

DETAILED DESCRIPTION OF THE PREFERRED EMBODIMENT

The same reference numeral is used throughout the description to denote the same element or part. Only those elements and parts required for the description and understanding of the invention have been shown. There are shown, in FIGS. 1–6, the component parts of a variable transmission whereby the output power operates either in forward or reverse, may transmit input power from either end of the transmission, namely from its reciprocating end or from its rotary end, is infinitely adjustable between front to back power or speed ratios and this infinite adjustment is linear and smooth throughout its adjustable range.

Referring now to FIG. 1, there is shown a partial cutaway plan view of the transmission 10 of the instant invention. This side of the transmission 10 is generally considered as the power input side; however, this side could be used as the power output side equally as well as hereinafter discussed. The input side wheel 12 and 24 have an opening 14 which allows a crank pin slide block 16 to translate therealong, as hereinafter discussed in more detail. The crank pin slide block 16 carries a crank pin 18 held in place by crank retaining screw or bolt 19. This crank pin connects to the crank arm 20. The surfaces 15 of the wheel opening 14 (side wheel 24 openings not shown but substantially identical as shown on side wheel 12) are constructed or lined with bushing material to allow the crank pin slide block 16 to be easily slidable therein. The crank arm 20 generally is connected to a reciprocating power source (not shown).

Referring now also to FIG. 2, the input side wheel 12 is interconnected through the jack shaft bearing block 22 by convenient means, such as, but not limited to, counter sunk screw means 23, to an output side wheel 24. The side wheels are also inter-connected at their outer surfaces by jack shaft sprocket bearing blocks 26, 27 and idler sprocket bearing blocks 28 (see FIG. 5). The jack shaft bearing blocks and idler sprocket bearing blocks are connected to the wheels 12, 24 by any convenient means, such as, but not limited to, counter sunk screws 23. A wheel axle mount 30 having a centrally attached axle 32 is attached to the output wheel 24 by counter sunk cap screw means 34 or the like. It should be understood that any other convenient means, such as, but not limited to, welding, brazing, etc., may be used to attach the axle to the mount or the axle and the mount may be an integral unit machined or cast.

As can be seen in FIG. 1, the idler sprockets 36 are spaced substantially 180° apart. A driven sprocket 38 is positioned on one end of jack shaft 40. The center line of jack shaft 40 is positioned substantially 180° of rotation from the idler sprockets' center line. The driven sprocket 38 is fixedly attached to the outer ends of jack shaft 40 by conventional means such as a bolt 42. Positioned between the inner surface of the head of nut 32 and the sprocket 38 is a retaining washer 43 and a pair of Belville ® spring washers. The forward center portion of sprocket 38 is counter sunk to accommodate the retaining washer and Belville ® washers. The Belville ® washers act as a clutch to provide relative movement between the jack shaft 40 and sprocket 38 under certain load conditioned hereinafter discussed. The jack shaft 40 is threaded along substantially its entire length except for a shoulder member 44 either machined thereon or attached by known means. This shoulder 44 is housed and locked in position within the central jack pillow block 22. The threads on each side of the pillow block 44 have opposite taper, that is, one side has right hand threads and the other side left hand threads. It matters not which side has which thread taper. As shown in FIG. 2, the crank pin slide block 16 is carried by threaded engagement on the side of the jack shaft 40 exposed by the input side wheel opening 14. A counter weight 46 is carried by the opposite side of the jack shaft 40. It should be readily understood that the turning of the jack shaft 40 causes the counter weight 46 and the crank pin slide block 16 to translate along jack shaft 40 toward or away from each other, that is both travel either from axle 32 outward toward the outer edge of the wheels 12, 24 or form the outer edge of the wheels 12, 24 inward toward axle 32. The jack shaft bearing block 26 has an opening 48 therethrough to allow the jack shaft 40 to pass therethrough and freely rotate therein. It should be noted that more weight is provided by pillow block 27 than pillow block 26 to provide substantially equal weight along each half of the jack shaft in the absence of a sprocket 38 on the pillow block 27 end of the shaft.

The outer ends of both wheels 12, 24 carry brake means 50 either in the form of a disk band or drum (the latter two not shown). The brake means 50 is loosely carried by the wheels through brake retaining ring 52. The brake means 50 is loosely connected to the wheels so that it will rotate with the wheels unless it is forceably held stationary as hereinafter discussed.

Each of the brake means 50 has a rectangular groove 54 inwardly facing around its periphery. A chain 56 is fixedly carried flatwise in the groove 54 of each brake means 50. Referring now to FIGS. 1 and 6, a chain keeper means 58 is shown. The keeper means includes a bore 60 in the brake means 50 at suitable locations around the brake means. This bore 60 has an outer threaded open end for receiving a threadedly engagable chain keeper means 62 that passes across the groove 54 and through the chain 56 thereby securing the chains in location around the brake means.

Referring now to FIG. 4, the positional relationship between the sprockets, chains and side wheels is shown. Although the sprocket shown in FIG. 4 is the driven sprocket 38, the relationship of the various components and the idler sprockets 36 would appear substantially the same.

Referring now to FIGS. 2 and 5, the driven sprocket 38 is held in position by the jack shaft sprocket bearing blocks 26, 27 and the idler sprockets are held in position by the idler sprocket bearing blocks 28, as hereinbefore discussed. The bearing blocks 26, 27, 28 include bearing surfaces 64, 66. The idler sprocket bearing blocks further includes an inner wall 68. The inner wall 68 includes an aperture 70 therethrough for receiving an axle pin 72 which has an enlarged head portion 74 adjacent wall 68. The axle pin 72 is fixedly attached at its opposite end to an idler sprocket 36 by keeper means 76. It should be understood that the idler wheels 36 may be rotatably supported by any other conventional means. A dust cover 78 encloses the space between the wheels 12, 24 and prevents foreign matter from getting therebetween. In a separate embodiment of this invention, the dust cover 78 is constructed as a cylindrical ring rigidly secured to the separate wheels 12, 24 and provides structural support to the wheels. In this separate embodiment, the necessity of the idler sprockets and their associated components may be eliminated.

Referring now to FIGS. 1 and 3, wherein a braking assembly 80 is shown. This braking assembly is shown as a conventional disk braking means fixedly supported through bracket 51 to structure (not shown) fixed in position relative to the brake means 50. A typical braking assembly as shown includes a pair of disk brake caliper assemblies 82 each having two piston assemblies 84, 84A having a sealed relationship through "O" rings 86 with a separate fluid cavity 88, 88A. Fluid delivered through either brake line 90 or 90A to cavity 88 or 88A in a conventional manner forces th pistons 84, 84A against brake means 50 stopping rotation thereof. The pistons 84, 84A disengage the brake means by return springs (not shown) in a conventional manner. It should be understood that the brake means 50 of side wheels 12, 24 each have a separate braking assembly and each have separate brake actuating means (now shown) that independently supply fluid to their associated hydraulic lines 90, 90A.

Referring now to FIG. 7, this fig. is substantially the same showing as FIG. 4, except that a ring gear 91 is carried by the brake means 50 instead of chain 56 and a pinnion gear 92 is attached to the jack shaft 40 instead of sprockets 38. It should be understood, although not shown, idler sprockets 36 would be similar to pinnion gears 92 or may be eliminated as discussed above. The ring gear 91 is attached to the brake means by conventional attachment means, such as, but not limited to, welding, brazing, pinning, bolting, etc.

OPERATION OF THE PREFERRED EMBODIMENT

It should be understood that in the typical operation of the transmission of the instant invention the axle 32 will pass through and be rotatable within a pilot bearing means comprising at least one axle shaft pilot bearing (not shown) to hold the transmission of the instant invention in a fixed position relative to input power means and output power applications. A housing may be included through which the axle freely passes which is fixedly attached to supporting structure.

As aforementioned, input power may be applied either through crank arm 20 or through axle 32 depending on whether the source of the input power is reciprocating or rotary. The transmission operates in the same manner with either type of power input.

For illustration, assume that the input power is from a reciprocating source, such as, but not limited to, a conventional cylinder, piston connecting rod combination.

Depending on the position of the crank pin on wheel 12 and the stroke of the piston, the transmission assembly 10 will rotate either in clockwise or counter-clockwise direction. The power application from the axle 32 would result in forward for one rotational direction of the transmission and reverse for the other rotational direction of the transmission assembly, the transmission output is adjustable with respect to the input power and rotational speed. The speed or power output is adjusted by the positioning of the crank pin 16 along radius of wheel 12 on jack shaft 40. To accomplish the translation of the crank pin along the jack shaft 40, either the brake assembly 80 associated with wheel 12 or brake assembly 80A associated with wheel 24 is actuated causing the brake means of that wheel to be stopped, preventing its usual rotation with its associated wheel. The stopping of the brake means causes the associated wheel to rotate the sprockets or pinnion gears resulting in the rotation of the jack shaft 40. The jack shaft rotation causes the crank pin slide block 16 and the counter weight 46 to translate along the jack shaft. As hereinbefore mentioned, the threaded engagement of the slide block and counter weight are such that each move toward or away from the wheel's center together. This feature ensures that a dynamic balance of the transmission assembly 10 is maintained regardless of the location of the crank pin slide block along the jack shaft. The releasing of the applied brake assembly causes the brake means associated therewith to again rotate with its wheel causing the rotation of the jack shaft to stop.

To prevent the slide block 16 from being forced against the extreme limits of opening 14, the nut 42 securing the sprocket 38 to the jack shaft 40 is adjusted to allow relative movement through the tension of fhe Belville ® washers between the jack shaft and the sprocket when a predetermined load limit therebetween is exceeded.

Means not shown are provided to ensure that only one brake means 50 is caused to stop at any given time.

Changes may be made in the form and proportion of parts and details of the device herein described and shown as a preferable embodiment of the invention, without departing from the spirit or sacrificing the advantages thereof, and therefore the right to make such changes and alterations in the device as fairly comes within its scope is hereby reserved.

What is claimed is:

1. A variable power transmission for converting reciprocating motion to rotary motion comprising:
    a rotatable wheel comprising first and second spaced apart interconnected disk members with openings therethrough forming linear bearings thereby;
    a crank member rotatably connected at one end to a crank pin for providing a rotatable force to said wheel;
    a shaft attached to the center of said wheel said shaft being driven by said wheel;
    means for selectively positioning said crank pin to any selected position along the radius of said wheel, said means for selectively positioning said crank pin along the radius of said wheel to any selected positioning comprises first and second first engaging means carried by first and second ring members each ring member positioned around the outer periphery of one of said desk members, each ring member being loosely connected to its associated disk, a threaded jack shaft rotatably attached to and positioned between said disk members, second engaging means carried by an outer end of said shaft and rotatable relative thereto for engaging both of said first engaging means, a crank slide block with said crank pin located on its outer end with its central portion threadedly engaging said jack shaft, said crank slide block extending through the openings in said first and second disk members and is guided and supported by said linear bearings, counter balance means carried in threaded engagement on said jack shaft and located opposite said crank slide block and braking means independently associated with each of said first engaging means for selectively stopping the rotation of a selected one of said pair of first engaging means;
    clutch means selectively adjustable through a range of different load limits positioned in series between the interconnection of said second engaging means and jack shaft to provide relative rotation between said jack shaft and second engaging means when an adjusted load limit between said second engaging means and said jack shaft is exceeded; and
    adjustment means for selectively adjusting the load limit between said shaft end and said second engaging means through a range of different loads.

2. The invention as defined in claim 1, wherein said first engaging means are ring gears and said second engaging means is a pinnion gear.

3. The invention as defined in claim 1, wherein said first engaging means are chains and said second engaging means is a sprocket.

4. The invention as defined in claim 1, wherein said jack shaft is threaded so that the opposing crank slide block and counter weight carried on said jack shaft move in opposite directions therealong.

5. The invention as defined in claim 1, wherein braking material is attached to said first engaging means.

6. The invention as defined in claim 1, wherein said braking material comprises disk type brakes.

7. The invention as defined in claim 5, wherein said braking means engages said braking material for stopping the rotation of said gear means.

8. The invention as defined in claim 1, wherein said braking means comprises drum braking means.

9. The invention as defined in claim 1 wherein said clutch means is attached to the end of said jack shaft and bears against said second engaging means.

10. The invention as defined in claim 1 wherein said clutch means comprises Belville type washers.

11. The invention as defined in claim 1 wherein said Belville type washers are positioned with their concave surfaces together.

12. The invention as defined in claim 10 wherein a load limit is established by varying the pressure between the contacting surfaces between said Belville washers, said second engaging means and said jack shaft outer end.

* * * * *